United States Patent [19]

Krueger

[11] E Patent Number: Re. 33,418

[45] Reissued Date of Patent: Nov. 6, 1990

[54] METHOD AND APPARATUS FOR PRODUCTION OF BIAS FABRICS

[75] Inventor: Ronald G. Krueger, Sparks, Nev.

[73] Assignee: JB Group, Inc., Greenwich, Conn.

[21] Appl. No.: 122,266

[22] Filed: Nov. 16, 1987

Related U.S. Patent Documents

Reissue of:

[64] Patent No.: 4,556,440
Issued: Dec. 3, 1985
Appl. No.: 603,096
Filed: Apr. 23, 1984

[51] Int. Cl.[5] ..... D04H 3/00; B32B 5/26

[52] U.S. Cl. ..... 28/102; 112/403; 156/181; 156/440; 156/93; 156/177; 66/84 A

[58] Field of Search ..... 112/304; 28/100, 102; 66/84 A, 85 A, 190–195, 203; 156/93, 177, 181, 439, 440

[56] References Cited

U.S. PATENT DOCUMENTS

| | | | |
|---|---|---|---|
| 2,890,579 | 6/1959 | Mauersberger | 66/85 A |
| 3,523,432 | 8/1970 | Vajda et al. | 66/85 A X |
| 3,557,268 | 1/1971 | Beretta et al. | 66/84 A X |
| 3,607,565 | 9/1971 | Eaton | 156/177 X |
| 3,756,043 | 9/1973 | Kemter | 66/84 A |
| 3,756,893 | 9/1973 | Smith | 156/93 |
| 3,761,345 | 9/1973 | Smith | 66/84 A X |
| 3,819,469 | 6/1974 | Balch et al. | 66/84 A X |
| 3,878,591 | 4/1975 | Jense | 28/100 |
| 4,025,239 | 10/1977 | Chen | 156/440 |
| 4,080,232 | 3/1978 | Friedrich | 156/177 |
| 4,325,999 | 4/1982 | Campman et al. | 156/181 |
| 4,395,888 | 8/1983 | Wilkens | 66/84 A |
| 4,444,025 | 4/1984 | Krueger | 66/84 A |
| 4,484,459 | 1/1984 | Hutson | 66/84 A |
| 4,567,738 | 2/1986 | Hutson et al. | 66/84 A X |
| 4,677,831 | 7/1987 | Wunner | 66/84 A |
| 4,739,635 | 4/1988 | Cowley et al. | 66/85 A X |
| 4,841,747 | 6/1989 | Frenzel et al. | 66/84 A |

FOREIGN PATENT DOCUMENTS

| | | | |
|---|---|---|---|
| 33874 | 10/1970 | Japan | 66/85 A |
| 1515803 | 6/1978 | United Kingdom | 28/100 |

OTHER PUBLICATIONS

"New Fabrics Without Weaving"; pp. 51–53; Modern Textiles Magazine, Nov. 1965.

*Primary Examiner*—Werner H. Schroeder
*Attorney, Agent, or Firm*—Darby & Darby

[57] ABSTRACT

Non-woven, bias laid fabrics, where the various fabric layers are held together by external means, such as stitching, and wherein, preferably, at least two of the layers are formed at an angle of from 30° to 150° relative to the long axis of the fabric, are formed by directing at least two pluralities of yarns back and forth across the width of the forming fabric, to be wrapped around or mounted on a series of needles formed on a moving conveyor, one conveyor being placed on either side and moving in the direction of the long axis of the fabric. Speed of movement of the yarns can be determined by the speed of movement of the mechanism for the machine operated to hold the various fabric layers together; preferably said machine mechanism moves more slowly near the ends of each cycle, so that yarn carriers are similarly slowed at either end of the forming fabric width, aiding in making successive courses of yarn lie parallel to each other without the necessity for extra equipment. In one embodiment of the invention, the yarn carriers are provided with means to propel them in a direction generally away from the bonding portion of the machine to further assure the parallelism of successive courses of yarn. It is not necessary that the number of needles correspond to the number of yarns.

18 Claims, 4 Drawing Sheets

METHOD AND APPARATUS FOR PRODUCTION OF BIAS FABRICS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to method and apparatus for forming bias laid, non-woven fabrics wherein, preferably, the yarns in at [feast] *least* two of the [paers] *layers* of fabric are [psid] *laid* at an angle of from 30° to 150° to the long axis of the fabric. In such fabrics, the yarns in the various layers are neither knitted, nor woven, but are held together by stitching through the layers, or by other external means, such as adhesive bonding.

2. The Prior Art

The history of fabric formation is a long one. Most fabrics are made by the now traditional processes of knitting, weaving, etc., and sophisticated machinery has been developed for automatically manufacturing fabrics in accordance with these techniques.

For many modern usages, particularly in areas where structural strength and integrity are required, fabrics manufactured by the older techniques cannot be used. Such uses include structural parts for high speed airplanes where the fabric is to be impregnated with a curable resin system.

In the modern usages referred to, the traditional knitted or woven fabrics do not provide sufficient strength, even when impregnated with a curable resin system, following cure, to provide the necessary uniformity and strength. Accordingly, non-woven fabrics have been developed for such utilization.

The non-woven fabrics which have been developed for these structural uses involve a series of layers which are laid down, generally in a continuously formed fabric, and with at least the final width of the fabric during formation, the layers ultimately being held together by stitching through the layers, knitting with a loose stitch through the layers, or adhesively bonding threads of the layers at crossing points. The composition of the stitching material or of the adhesive material is not of critical importance, so long as the material has sufficient strength to hold the various layers together up to the time of resin impregnation, since the final strength of the part formed and the holding of the various yarns of the fabric in their proper position is accomplished by the cured resin.

The most desirable of the non-woven fabrics for structural purposes has been found to be those with at least two layers, the yarns of which are at an angle of approximately 45° to the long axis of the fabric direction, the two layers lying at 90° to each other. There can be more than two layers of yarns, depending upon the end use to which the fabric is to be put and either the first two layers, or any successive layers, can be placed at angles varying from 30° to 150° to the long axis of the fabric. If desired, a series of warp threads, lying parallel to the long axis of the fabric, a series of weft threads, lying at approximately 90° to the long axis of the fabric, or both, can be included. Once all of the fabric layers have been placed, the fabric is held together for storage, shipment, and ultimate impregnation, by one of the referenced methods, i.e., stitching, loose weave knitting, or adhesive bonding.

Among patents showing the formation of similar, types of fabric are Eaton, U.S. Pat. No. 3,607,565; Smith, U.S. Pat. No. 3,765,893; and Campman et al, U.S. Pat. No. 4,325,999.

The Campman et al patent particularly describes a number of methods for forming bias laid, non-woven fabrics, as generally referred to in the present patent application. However, as will be observed from a review of Campman et al, successive courses of each set of yarns there are laid in a pattern such that each course is angled at 90° to the previous course. For purposes of this invention, a course is defined as the plurality of yarns laid together in traversing the distance from one side of the fabric being formed to the opposite side: when the plurality of yarns reverses directions, and returns from the second side to the first side, that is a second course.

In Campman et al, prior to the reversal of direction of the yarns, so as to lay a second course, the yarns are wrapped around a series of pins, the number of pins corresponding to the number of yarns being laid. When the plurality of yarns is returned to the first side of the forming fabric, the yarns are wrapped about a set of pins formed on the conveyor on the first side, and, again, direction reversed by 90° so as to be returned to the second side for a fourth course. Campman et al do show one embodiment in which the courses of yarns formed by a single set of moving yarns are parallel to each other. That is, essentially, shown in FIG. 10 of the Campman et al patent, and the portion of the disclosure relating to that figure. However, a relatively complex mechanism is necessary to accomplish this parallelism between courses, the complex mechanism including two sets of pins on each side of the fabric being formed to allow the second, or return course, to be parallel to the first. None of the other automatic types of bias fabric formation machinery known to applicant provide even a mechanism of this complexity for forming parallel courses.

The inability to provide parallel courses results, in many instances, in a diminution of strength of the structural member being formed from these bias laid, non-woven fabrics. Further, because there is a waste of yarn due to the 90° return angle, which causes the second course to partially overlie the first cource, the expense of the bias laid, non-woven fabric is greater than it would be if parallel courses were possible.

A method and apparatus which would provide for the yarns in successive courses to be laid parallel to those in previous courses, without the complicated mechanisms of the prior art, would be extremely valuable. Similarly, method and apparatus which would allow for the use, but spacing, of a number of yarns greater than the number of pins formed on the traveling conveyors would provide for greater flexibility in the formation of bias laid, non-woven fabrics, and the production, with relative ease, of fabrics tailored to particular structural uses, as dictated by the needs of those uses. Still further, some overlapping of courses can be provided for, but that overlapping can be controlled, again for the needs of the structural item to be formed, and not as dictated by the limitations of the method and apparatus for forming the bias laid, non-woven fabric.

BRIEF DESCRIPTION OF THE INVENTION

In accordance with the present invention, bias laid, non-woven fabrics can be produced with all of the yarns in a given layer parallel to each other, without the use of complex machinery. Further, if desired, there can be a slight, but controlled overlapping of the yarns in a given layer employing a slightly different method of operation of the equipment, and a slightly different process. Still further, because of the manner in which the equipment is formed, the number of yarns in a given course need not correspond to the number of attachment points on the conveyor in the same space.

While the disclosure of the present invention primarily describes the use of a sewing machine to bind together the various layers of a bias laid, non-woven fabric, it will be appreciated that other methods of bonding the layers to each other can be employed, including loose weave knitting, adhesive application, etc.

In accordance with the present invention, the apparatus for stitching the various layers of the bias laid, non-woven fabric together can be any of the machines presently employed in the textile industry for such a purpose. For example, the machine presently sold by Liba Maschinenfabrik GmbH of West Germany under the designation Copcentra-HS is suitable for formation of fabrics in accordance with the present invention. Both because this machine is known to the trade, and because the present invention does not include, as novel subject matter, the method of stitching the various layers together, this specification will not include a detailed description of the sewing machine. The Liba Copcentra-HS machine is provided, in its operative gearing, with an oscillating crank mechanism. Because of the inherent nature of the operation of such a crank, the oscillating drive shaft controlled by the mechanism moves more slowly before its direction is reversed. By keying the movement of the yarn laying mechanism to this oscillating drive shaft, movement of the yarn laying mechanism is slowed at the end of each course, which allows the conveyor mechanisms to move relatively further forward than would otherwise be true, and aid in gaining parallelism of the various courses. This will be explained more fully in this specification.

In accordance with the present invention, a pair of parallel conveyors is formed, the front supports of the conveyors being at the head of a bonding mechanism, such as a Liba Copcentra-HS stitching machine. Each conveyor carries a series of equidistantly spaced needles which extend outwardly from the space between the conveyors and are angled slightly toward the bonding mechanism. The fabric to be formed is placed on these conveyors and, more particularly, the individual yarns are placed around or on the individual needles. In general terms, each conveyor is comprised of an endless chain to which are attached members on which the individual needles are formed, the members, on the operating portion of the conveyor belt, forming a continuous, moving bar. The drive mechanism for the conveyors is independent of the drive mechanism for the yarn carriers, at least in the sense that the conveyors are moved at a constant speed.

Yarn carriers move back and forth between the moving conveyors. Each yarn carrier carries a plurality of individual, equally spaced yarns. The yarn carriers are caused to have downwardly beyond each conveyor and, more particularly, beyond the needles formed on the conveyors, so as to place the individual yarns around the needles, or to cause a needle to impale one of the yarns. Thus, it will be recognized that the number of yarns in a given linear dimension need not equal the number of needles in the same linear dimension. When the number of yarns in a given linear dimension is greater than the number of needles in the same linear dimension, some of the yarns will be impaled by the needles, providing for a more uniform coverage. In this way, the density of each layer can be controlled, as desired.

The number of yarn carriers employed, and thus the number of individual layers, is determined by the end use of the bias laid, non-woven fabric being produced. The angle at which the yarn carriers place the courses of yarn on the moving conveyors is, likewise, determined by the end use to which the final fabric is to be put. While for many uses, angles of 45° to the long axis of the fabric, for each of two courses, is preferred, it will be apparent that other angular settings can be employed and that more than two layers can be placed on the moving conveyors. Generally, the bias laid layers are at angles of between 30° and 150° to the long axis of the fabric. In addition to the bias laid layers, however, a warp layer can be included in the fabric being formed, the yarns in the warp layer being placed in the standard manner essentially parallel to the moving conveyors. Similarly, one of the yarn carriers can be so angled as to place a weft layer onto the fabric being formed, the angle of the weft layer being the standard, essentially 90°, to the long axis of the fabric.

As previously indicated, the two conveyors move at a constant speed toward the bonding mechanism where the fabric layer are bound together. The yarn carrying means, while moving at a generally constant speed across the fabric being laid, are slowed down in their travel across the fabric at the end of each course. Because the movement of the yarn carrier is keyed to an oscillating crank mechanism, and because that crank mechanism slows down near the end of each stroke, movement of the yarn carrying mechanism is also slowed near the end of the stroke, which is keyed to correspond with the end of the course. However, the conveyors do not move rapidly enough relative to the movement of the yarn carrier for each of the needles which is surrounded by a yarn or which impales a yarn in a given course to be moved clear of the yarns on the yarn carrier prior to the yarn carrier beginning its return movement for the next course. As a consequence, if no additional action is taken, the trailing needles from the first course will again be surrounded by or will again impale yarns as the yarn carrier begins its return motion. If parallelsim in courses is desired, the yarn carrier is fitted with a mechanism which causes it to be moved generally rearwardly at the end of the course, the amount and timing of the rearward motion being such that the conveyor will have moved forward a distance calculated to cause the needles employed for the second course to be those immediately behind the needles employed for the first course, with no overlap. In this way, the courses of fabric laid down as the fabric is being formed can and will be parallel to each other. Of course, the yarns in succeeding layers can be placed over the first layer in exactly the same way, but at a different angle, chosen according to the end use to which the material so formed is to be put. Further, there may be some overlapping in a given course, while still maintaining parallelism, by proper control of the mechanism for moving the yarn carrier rearwardly.

While for many utilizations the complete parallelism of courses within a layer is desirable, for some utilizations, it has been found that extra strength in the final product is obtained when the bias laid, non-woven fabric has some angular overlap from one course to the next. This, of course, is in addition to the overlap of layer upon layer of bias laid fabrics. When a fabric of this type is to be made, the means previously described for forcing the yarn carrier in a direction away from the sewing or bonding head is not employed. However, because of the keying of the yarn carrier movement to the oscillating crank mechanism, the 90° turns described by Campman et al are not experienced. Rather, the group of yarns is returned in a direction generally the same as that in which the prior course was laid, but with a few of the conveyor needles being covered by yarns from each course, so as to result in a slight overlapping of yarns which are at small acute angle to each other before contacting the opposite side of the moving fabric in formation. Again, this is accomplished with the relatively simply mechanism of the present invention and, again, any number of layers can be employed, including the 0° warp and 90° weft layers, in addition to the bias-laid layers. In this configuration, as well, some of the yarns will be wrapped around the needles on the side conveyors, while other yarns will be impaled by the needles. The reasons are the same as for the fully parallel course fabric configuration. With the fabric in the configuration just described, additional density can be achieved without the necessity for further layers of yarn.

Thus, the present invention provides for the formation of bias laid fabrics where all of the yarns in a given layer are parallel to each other, or some portion of the yarns are at a slight, acute angle to the yarns in the preceding and following courses. The parallelism in a given layer is achieved without complex machinery. Further, because the number of yarns need not equal the number of needles over a given linear dimension, greater density and uniformity are provided. Use can be made of the mechanism of the bonding portion of the apparatus to control the laying of the yarns so as to achieve these advantages.

BRIEF DESCRIPTION OF THE DRAWINGS

In the accompanying drawings

DETAILED DESCRIPTION OF THE INVENTION

Figure 1:
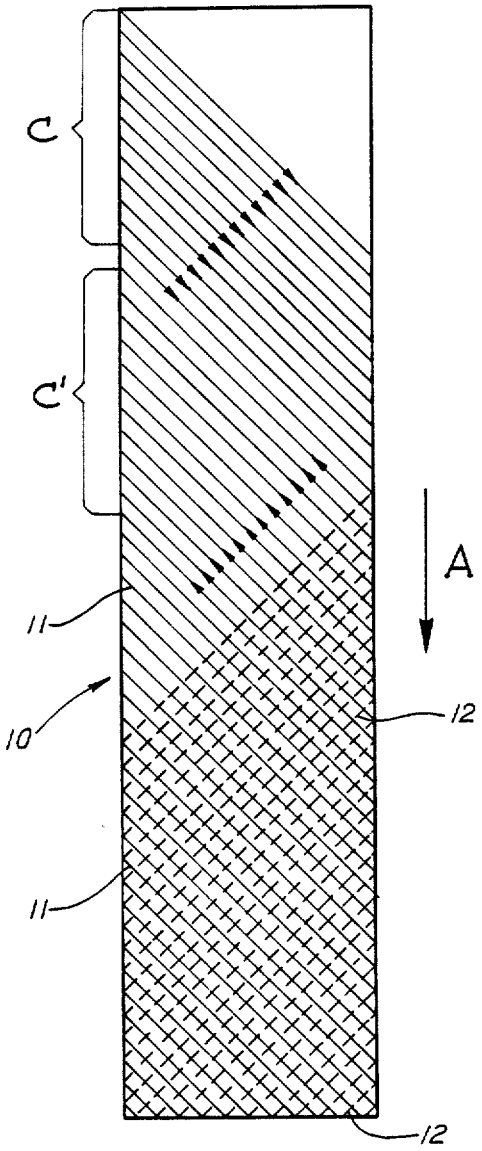
FIG. 1 is a plan view of one preferred form of bias fabric in accordance with the present invention.

In FIG. 1, a bias laid fabric 10 formed from two layers of yarn, the layers intersecting each other at approximately a 90° angle, and all of the yarns in a given layer being parallel, is illustrated. The arrow A illustrates the direction of travel of the fabric in formation on machinery and in accordance with a method to be described below. As shown, one course of yarns C is laid in a direction, generally from left to right, as shown in the drawing. At the termination on the right hand side, the yarns are hooked around or onto needles on a conveyor, as will be described later, and the direction of the yarn carrier is reversed to go, generally, from right to left. Because of the coordination between the moving conveyors and the yarn carrier, the yarns in the second course C′ are laid down parallel to the yarns in the first course C. The solid lines 11 in FIG. 1 represent yarns laid down in the same layer as those in courses C and C′, but prior to the laying of courses C and C′. For illustrational purposes, the dotted lines 12 in FIG. 1 represent a layer laid on top of the solid line yarns in the first layer, the yarns 12 having been laid over the yarns 11, in the same manner and, as can be seen, parallel to each other, but at an angle of approximately 90° to the yarns 11.

Figure 2:
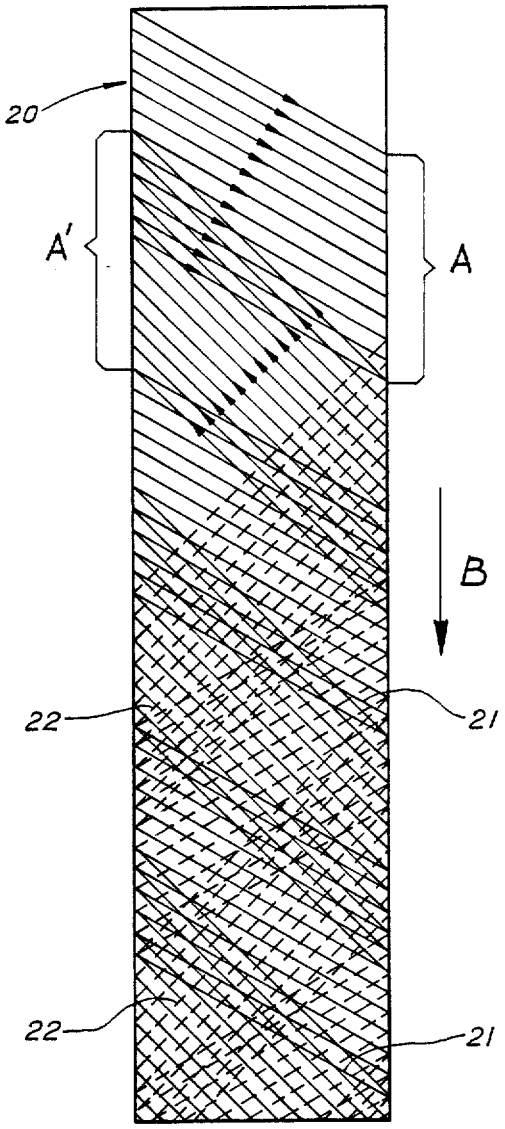
FIG. 2 is a plan view of a second form of bias fabric in accordance with the present invention.

The fabric 20 of FIG. 2 shows a second embodiment of bias laid fabric in accordance with the present invention. As can be seen from the following description, the yarns in a given layer in accordance with this embodiment are not parallel to each other, but are laid down so that there is a partial overlap of a second course over a first course, the yarns in a succeeding course being at an acute angle to the yarns in the previous course. As illustrated, the yarns in a first course A are laid in a generally left to right direction. When the yarn carrier carrying the yarns A reaches the right hand side, it is depressed to wrap the yarns around or impale them on the needles on the conveyors. When the yarn carrier returns to the left hand side, the conveyor has not moved a distance sufficicent to clear all of the yarns in the course A. As a consequence, some of the yarns in the course A′, the following course, overlap some of the yarns in the course A, to provide the slight overlap described, the yarns in course A′ being at an acute angle relative to the yarns in course A. Similarly when the yarn carrier has completed its traverse to the right, and has been depressed to wrap the individual yarns around or impale them on the needles of the right hand conveyor, the conveyor will not have moved a sufficient distance to totally clear all of the yarns from course A′, so that the following course, which is not illustrated, will slightly overlap the rearward yarns in course A′.

Other solid line yarns 21 illustrated in FIG. 2 represent yarns of the same layer as courses A and A′ which were previously laid, while for illustrational purposes, the dotted lines 22 represent yarns laid subsequent to laying of the yarns in the layer including courses A and A', to form a second layer. This second layer is placed in the same manner as courses A and A', but overlying that layer, so that, again, there is a slight overlapping of the yarns in the second layer.

Figure 9:
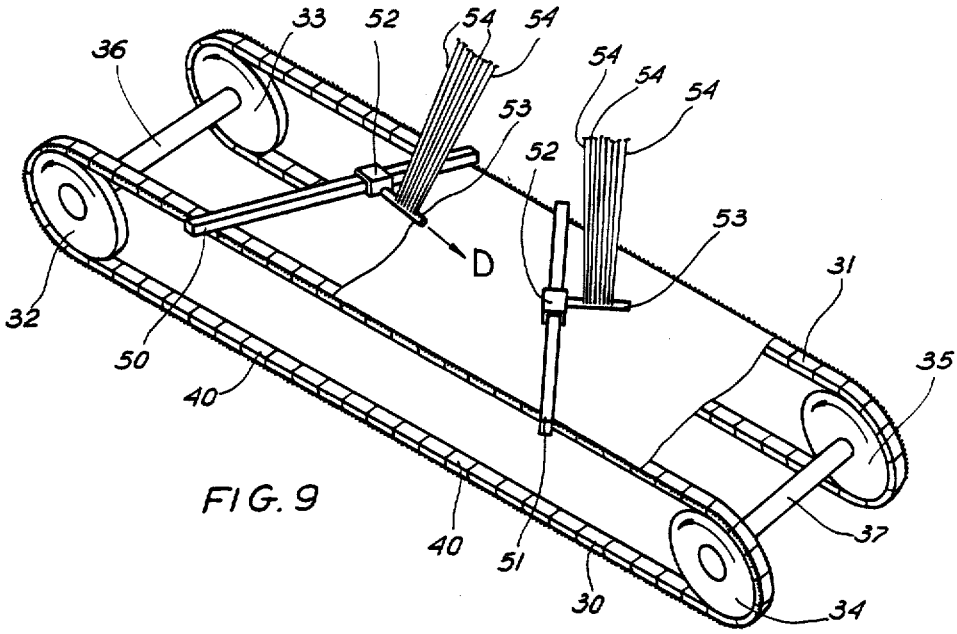
FIG. 9 is a perspective view of the overall fabric forming mechanism in accordance with the present invention.
Figure 10:
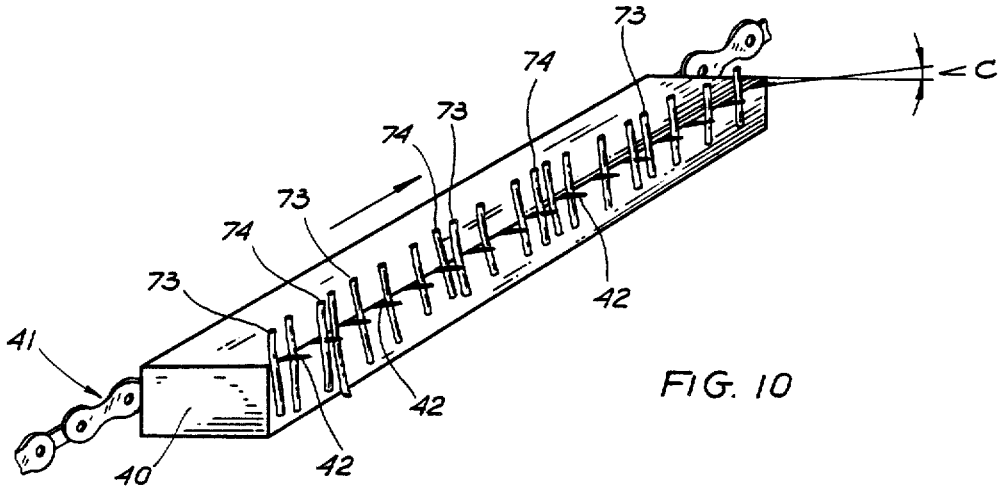
FIG. 10 is a perspective view of a single needle block, in accordance with the present invention, positioned on the chain conveyor.

An overview of the placement of the bias laid yarns in accordance with the present invention is shown in FIG. 9. Two endless conveyors 30 and 31 are shown, respectively, on the left and right hand sides. These conveyors 30 and 31, which are of the same length, are driven at the same speed by forward pulleys 32 and 33 and are suspended on rearward pulleys 34 and 35. Forward pulleys 32 and 33 are connected by axial member 36, while rearward pulleys 34 and 35 are connected by axial member 37. Each conveyor includes a plurality of blocks 40, better illustrated in FIG. 10, which are carried on the conveyor means, such as endless chain 41. Formed onto, or from, each block are a series of sharp needles 42 which, as illustrated by angle C are directed slightly forwardly relative to the direction of travel of the upper portion of each conveyor, along the long axis of the fabric being formed.

Formed across, but slightly above, the conveyors 30 and 31 are a plurality of guide arms 50, 51. Two such arms are illustrated for laying of two layers of yarn, but it will be appreciated that additional guide arms and complete yarn laying assemblies can be provided, depending upon the number of layers of yarn to be incorporated into the bias laid fabric. Moving along each of the guide arms is a member 52 to which is attached a yarn carrier 53, each yarn carrier being employed for laying a plurality of yarns 54.

Figure 5:
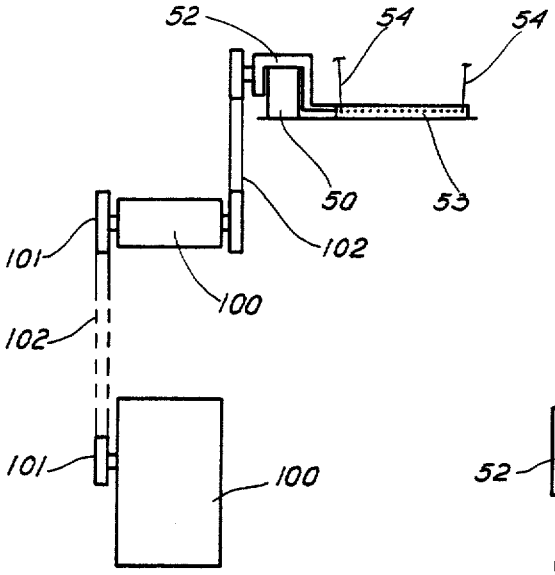
FIG. 5 is a representational view of a portion of the drive mechanism connection between the oscillating crank mechanism of FIG. 4 and the yarn guide employed in accordance with the present invention.

A more complete illustration of the feeding of the yarns to the yarn carrier 53, along with the yarns supplied is given in FIG. 5. A yarn storage unit or creel 60 supports a plurality of spools or bobbins 61 from which the yarn to be made into the fabric is drawn. An individual spool or bobbin feeds a single yarn 54 to a yarn guide 62 and, from the yarn guide 62, the plurality of yarns 54 is led to the yarn carrier 53, from which it is placed on the moving fabric being formed. The yarn guide and yarn carrier act to provide for uniform tension in the yarns 54 being laid, and to provide accurate spacing between individual yarns 54.

Figure 8A:
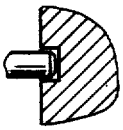
FIG. 8A is a sectional view along the line 8A—8A of FIG. 8.
Figure 8:
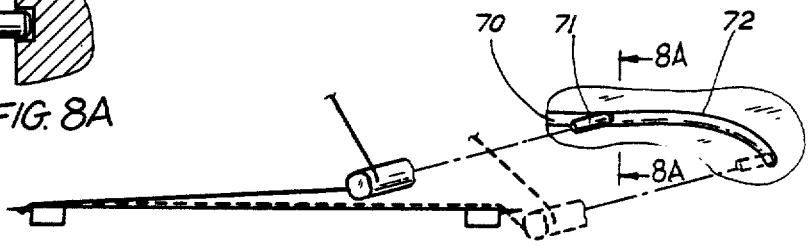
FIG. 8 is a perspective view of the cam mechanism for depressing the position of the yarn guide at the end of each course.

The guide members 50 and 51, are provided with a generally horizontal slot 70, best illustrated in FIG. 8. A guide pin 71, formed or attached into the portion of the yarn catrier 53 which is adjacent the guide 50 or 51 rides in this generally horizontal slot 70, as shown in FIGS. 8 and 8A. At either end of the guides 50 and 51, at a point beyond each of the conveyors 30 and 31, the generally horizontal slot is formed with a gradual curve 72, downwardly, so formed as to cause the yarn carrier 53 to move downwardly, and to carry the individual yarns 54 to a point below the individual needles 42 on the bars 40. As the yarn carrier 53 reverses direction, to travel to the opposite side of the yarn forming mechanism, it moves upwardly along the cam slot 72, causing the individual yarns to be placed around the needles as illustrated, for example, by yarns 73 in FIG. 10, or to be impaled on the needles, as illustrated by yarns 74 in FIG. 10. In this manner, the individual yarns are held in their desired position at the end of a course, and proper tension is applied to the yarns forming the next course as the yarn carrier 53 makes a return pass across the fabric forming mechanism.

Figure 7:
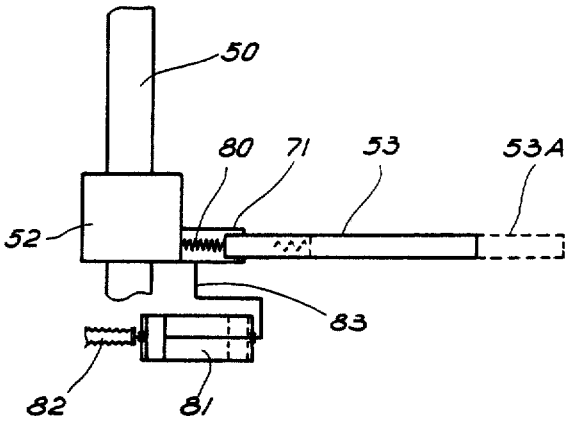
FIG. 7 is a plan view of the yarn carrier employed in accordance with the present invention, and means for moving it from its normal travel path.
Figure 6:
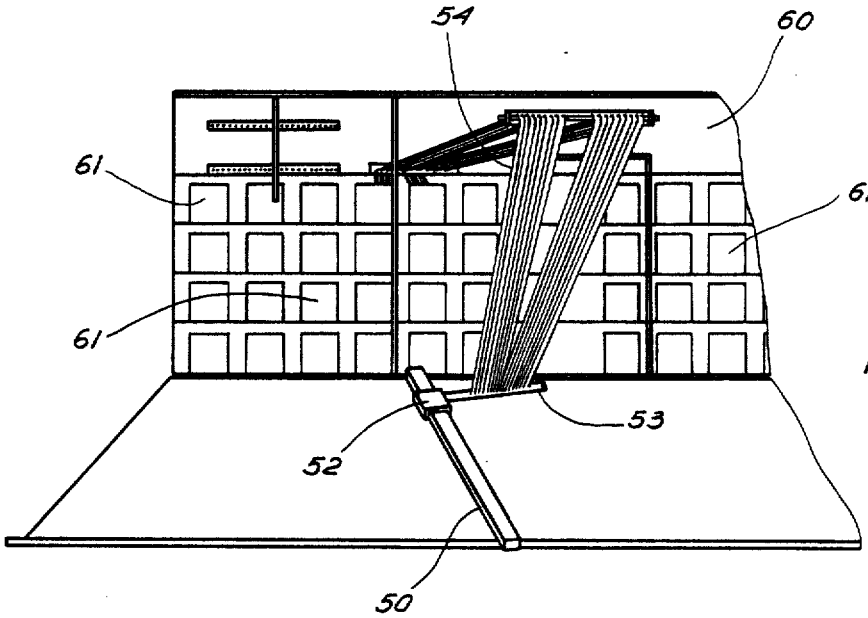
FIG. 6 is a perspective view, partly representational, showing the mechanism for placing the bias laid yarns on the conveyors.

A more detailed view of the yarn carrier 53 of the present invention, in a desired embodiment in accordance with the present invention, is illustrated in FIG. 7. The guide 50 has slidably mounted to it the mounting member 52 and, through that mounting member is placed the guide pin 71. The yarn carrier 53, as illustrated in FIG. 7, is slidably mounted within the pin 71 and is attached, at one end, to a tension spring 80, for a purpose to be described. As illustrated, the device also includes a pneumatic cylinder 81, attached to a source of air or other gas under pressure 82. The pneumatic cylinder 81 is also connected with the hollow pin 71 by connection 83. When it is desired to move the yarn carrier 53 rearwardly, to the position shown as 53A in FIG. 7, this being in a direction shown by arrow D in FIG. 9, air or other high pressure gas is caused to flow by air cylinder 81 into the hollow pin 71 where it acts to force yarn carrier 53 to the position 53A. When the air pressure is relieved, tension spring 80 causes the yarn carrier to return to the position 53. It will be appreciated that the application of air or other high pressure gas is timed to coincide with the positioning of the yarn carrier 53 at a position outside either the conveyor 30 or the conveyor 31, the purpose being to delay the placement of yarns 54 on the return movement of yarn carrier 53 until the conveyor 30 or conveyor 31 has moved to a point that the needles 42 to be contacted by the yarns 54 are those immediately beyond the needles on which the yarns of previous course have been wrapped around or impaled on. Similarly, the release of air pressure is timed to allow the yarn carrier 53 to assume the position 53 shown in FIG. 7 on the return traverse of the yarn carrier across the fabric forming mechanism. Obviously, the pneumatic system can be replaced by other mechanisms, such as a solenoid, to accomplish the same purpose.

Figure 3:
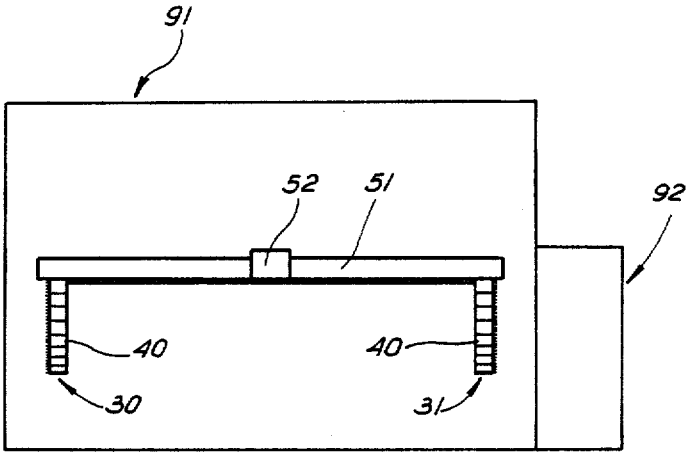
FIG. 3 is an end view of a machine for stitching the bias laid fabric employed in accordance with the present invention.
Figure 4:
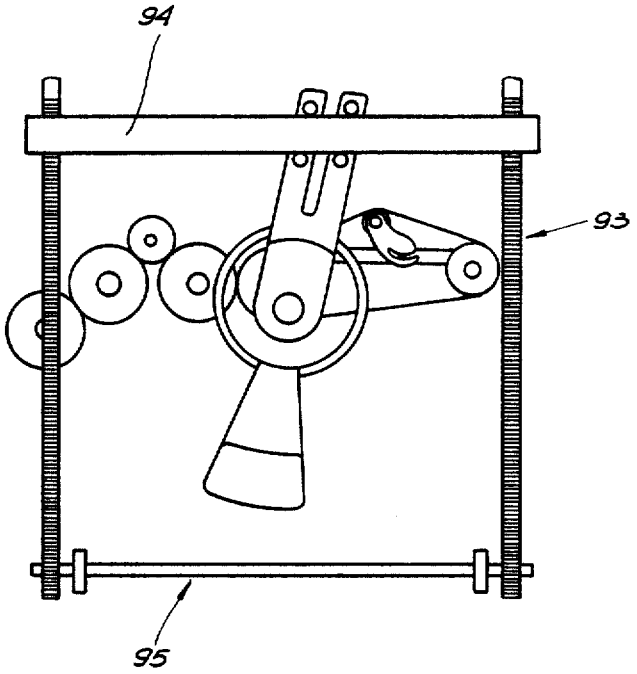
FIG. 4 is a plan view of an oscillating crank mechanism employed in the stitching portion of the device shown in FIG. 3.

FIG. 3 illustrates one of the means for holding together the yarns which have been laid to form the bias laid, non-woven fabric in accordance with the present invention. Illustrated are a stitching machine 91, which may be the Liba-Copcentra-HS previously referred to, as well as the blocks 40 formed on conveyors 30 and 31 as they pass over rearward pulleys 34 and 35. Also illustrated is guide arm 51 with member 52. The forward pulleys 32 and 33 are not visible, since, in addition to being in front of the pulleys 34 and 35, they are actually on the side of machine 91 opposite that of the figure, the side illustrated being that toward which the conveyors 30 and 31 move, as illustrated in FIG. 9. The stitching machine 91 has a machine compartment 92 within which is located an oscillating crank mechanism 93, as illustrated in FIG. 4. It is not believed necessary to describe the specific parts of the oscillator crank mechanism as they are, essentially, standard for such a mechanism. As is known, at either end of a cycle of operation, as illustrated by the upper limit or lower limit of the crank member 94, the oscillating drive shaft is moving more slowly than in the center of the oscillation. By appropriate gearing, this oscillating drive shaft is keyed to the yarn carrier drive mechanisms and the reversal of the oscillating drive shaft is made to coincide with the extreme position of the travel of yarn carriers 53. The oscillating drive shaft 95 is illustrated, for example, in FIG. 4. The specific type of connection, such as by gearing, drive belt, etc., is not believed important to the present invention. Rather, connecting gear boxes 100, pulleys 101, and drive belts 102 are illustrated in FIG. 5 as examples of a means of connecting and keying the oscillating drive shaft 95 shown in FIG. 4 to the yarn carrier 53 so that the yarns 54 are moved at the proper time and at the proper speed.

In accordance with the present invention, in order to form a bias laid, non-woven fabric employing the apparatus of the present invention, a series of spools or bobbins 61 of a yarn selected based upon the end use to which the fabric is to be put are placed upon a creel 60. It will be apparent that the denier of the yarn is also based upon the end use to which the fabric is to be put and, within very broad limits, the process of the present invention is not affected by the denier of the yarn. Further, different layers of the fabric can be formed from different yarn compositions, again depending upon the end use to which the fabric is to be put. Thus, it will be appreciated that neither the composition nor the exact size of the yarn are a factor of the present invention.

Yarns from individual bobbins or spools 61 are fed through openings in the yarn guide 62, one yarn per opening. These yarns are then fed through individual openings in the yarn carrier 53. The only place that spacing is important is in the yarn carrier 53 and the spacing, in that apparatus, along with the spacing of the needles 42 determines the density of the fabric being formed. Generally, there are from 1 to 60 or more yarns per linear inch of the fabric being formed. In a preferred embodiment, in accordance with the present invention, there are 16 needles 42 per linear inch, but there are 20 openings per linear inch of fabric in the yarn carrier 53. It will be appreciated that the spacing of the yarn in the openings in yarn carrier 53 are not the same as the number of yarns to be laid per linear inch of fabric, in view of the angling of the yarn carrier 53 relative to the long axis of the fabric being formed. The needles 42 are generally angled at approximately 5° to 45° to the forward direction of the bar.

It will thus be appreciated that in this preferred embodiment there are fewer needles than yarns. Because of this, while some of the yarns will be wrapped around needles 42 and, indeed, in a few cases more than one yarn may wrap around the same needle, some of the yarns will be impaled by the needle, as illustrated by 74 in FIG. 10. Because of the systems of the prior art where the yarns were carried to the needles and fed over the needles by a tube, this system of the present invention was basically impossible in the prior art. In fact, the impaling of a few of the yarns on the needles, and the utilization of a number of yarns greater than the number of needles per linear inch provides for more uniform coverage and for the ability to form different densities of fabric, particularly the density in a particular layer.

Through a driving means the yarn carriers are moved back and forth across the long axis of the fabric being formed. Either the bonding mechanism contains a driving means, such as an oscillating crank mechanism, which causes the speed of the yarn carrier to be reduced near the end of its travel, or such an oscillating crank mechanism is provided, separate and apart from the bonding unit, in order to accomplish the same results. In addition to being slowed down by this mechanism at either end of its travel, it is necessary to cause the yarn carrier to drop down below the level of the needles 42, when the carrier has passed beyond those needles and the associated conveyor. This dropping down is required in order to allow the yarns to be wrapped around the needles, or to be impaled by them. This is accomplished by mounting the yarn carrier on a guide pin which travels in a horizontal slot in a guide arm, that slot being angled downwardly beyond the conveyor, so as to cam the yarn carrier downwardly, and move the yarns below the horizontal level of the needles. On the return stroke, the yarn carrier moves upwardly, completing the operation of wrapping the yarns around the needles, or impaling them, and then returns across the fabric being formed.

When it is desired, because of the end use of the fabric being formed, the courses of yarns, i.e., the yarns laid in successive passes back and forth by given yarn carrier, are made parallel. In part, this parallel laying of the yarns is accomplished by the manner in which the yarn carriers are keyed to the oscillating crank of the bonding unit, or to the separate oscillating crank unit, when compared with the speed at which the conveyors 30 and 31 are driven. However, generally, the relative speeds are such that all of the needles on which yarn has been wound or impaled by a given pass of the yarn carrier have not moved forward and out of the way of the yarn carrier. To allow additional relative motion of the conveyor compared with the yarn carrier, the yarn carrier can be provided with a mechanism, such as a pneumatic cylinder, which moves the yarn carrier generally rearwardly, or in a direction generally opposite that of the direction in which the conveyor is moving. This movement is so timed that the conveyor is allowed to move forwardly a distance sufficient that when the yarn carrier 53 returns to its regular path of travel during its return pass across the mechanism, the needles around which it wraps the yarn or impales the yarn are those immediately following those needles acted upon in the immediately preceding course or pass.

In this way, the yarns laid down in each layer are all parallel to each other, as illustrated in FIG. 1.

As the fabric which has been laid reaches the forward part of the conveyors 30 and 31, it passes through the bonding mechanism representationally illustrated at 91. As indicated, this bonding mechanism can be a Liba Copcentra-HS unit which will provide stitching through the various layers which have been put down on the apparatus, and in accordance with the method just described. The number of rows of stitching need only be sufficient to allow the fabric so formed to be held together and stored, prior to being employed in its ultimate use.

As indicated, the fabric formed in accordance with the present process is generally used in the formation of structural parts, as in airplanes, and in such a use is wrapped around a mold, or laid into a particular position, after which, or prior to, being impregnated with a resin. When the fabric is fully in place and impregnated, the resin is cured to complete formation of the part.

While the description of the present invention has involved a stitching of the various fabric layers together, it will be appreciated that other methods for holding the non-woven fabric in place can be employed. For example, a loose knitting operation, as is known in the art can be employed. Further, a light resin spray can be applied to bond the fibers at their crossing points. Again, the material which is employed for this bonding, or the materials used, are not of critical importance, as the ultimate strength of the bias laid non-woven fabric comes from the resin which is finally used for impregnation and which is cured with the fabric in place. If the bonding mechanism used for the fabric does not have a device, such as the oscillating crank of the Liba Copcentra-HS, then such a mechanism must be independently provided for driving of the yarn carriers in order to provide for their reduced speed of motion near the ends of the travel paths.

No mention has yet been made in this specification of the loops which are obviously formed, either by the yarns wrapping around the various needles or by being impaled on them. As is apparent, these loops are at the extremities of the width of the fabric being formed. After stitching or other methods of bonding, so that the fabric is generally held together, the loops can be cut away by any known mechanism. Once the other bonding means have been put into place, the loops, which had served only the function of holding the fabric in place up until that time, are no longer required.

The various steps and equipment just described for formation of a bias laid, non-woven fabric where all of the yarns in a particular layer are parallel to each other apply, with essentially one exception, to the formation of a fabric where all of the yarns in a given layer are not parallel, but where there is a minor overlap of such yarns, the yarns in one course forming a minor acute angle with those of the prior course. In general, that acute angle is from about 2° to 20° and is employed when the end use for the fabric requires such an overlap. Generally, the referenced mechanism for moving the yarn carrier rearwardly is not employed when the fabric is to take this form, such as is illustrated in FIG. 2. This minor overlap is achieved by using some percentage of the needles from a previous course on the return course, the number of needles being generally no more than about 50% of those in the previous course in an overlap relationship. This small overlap, rather than, for example, the complete overlap and reversal shown in Campman et al, is accomplished because of the slowing of the yarn carriers at the ends of their path of travel in each course.

While the invention has been illustrated and described in accordance with particular embodiments, it will be apparent to those skilled in the art that variations are possible within the spirit and scope of the invention. Accordingly, the invention is not to be considered as limited except as set forth in the appended claims.

I claim:

1. A method for forming a bias-laid, non-woven fabric employing a pair of movable, parallel conveyors, said conveyors lying parallel to the long axis of the fabric being formed, and at the extremities of the short axis, each of said conveyors being provided with a series of needles, said needles being aimed away from the fabric being formed, comprising:

a. providing at least two yarns carriers which lay a plurality of yarns, the yarns from each carrier lying parallel to each other, from a first conveyor to a second conveyor and, subsequently, from said second conveyor to said first conveyor, the yarns from the second carrier lying at a predetermined angle to those from the first carrier;

b. providing means to [horizontally] *vertically* depress said yarn carrier at a point outside of each said conveyor whereby to wrap said yarns about said needles or impale said yarns on said needles:

c. providing a first driving means for said conveyors: and d. providing a second driving means for said yarn carriers, said second driving means providing for a reduction in the speed of movement of said yarn carriers at the extremities of travel.

2. The method of claim 1 wherein a bonding means is provided for holding together the various layers of fabrics placed on said conveyors.

3. The method of of claim 2 wherein said bonding mechanism is a stitching machine.

4. The method of claim 2 wherein means are provided to remove the portions of the yarns which have been wrapped around or impaled on the needles of said conveyor mechanisms, following said bonding.

5. The method of claim 2 wherein the bonding means provides at least said second driving means.

6. The method of claim 1 wherein the needles are angled toward the direction of travel of said conveyor.

7. The method of claim 1 wherein, at each extremity of travel, beyond said conveyor, said yarn carrier is caused to move rearwardly, generally opposite the direction of travel of said conveyor.

8. The method of claim 1 wherein the number of yarns per linear dimension laid by said yarn carrier is greater than the number of needles for the same linear dimension formed on said conveyor.

9. An apparatus for forming a bias-laid non-woven fabric including:

a. a pair of parallel conveyors, said conveyors being parallel to the long axis of a bias-laid non-woven fabric to be formed, and lying at the extremities of the short axis of said fabric, said conveyors being provided with a plurality of equally spaced needles, said needles facing away from said fabric to be formed:

b. at least two yarn carriers, each said carrier having a plurality of openings, each said opening being provided so as to accommodate a single yarn to be laid in the traversing of said yarn carrier from one conveyor to the other conveyor, the mounting for said yarn carrier providing for travel of said yarn carrier to a point beyond the needles formed on said conveyors:

c. first means to drive said conveyor mechanisms;

d. second means to drive said yarn carriers, said second driving means reducing the rate of travel of said yarn carrier at the extremity of travel; and e. means for bonding the formed, bias-laid, non-woven fabric.

10. The apparatus of claim 9 wherein said second driving means is a portion of the mechanism of said bonding means.

11. The apparatus of claim 9 wherein said bonding means is a stitching machine.

12. [Ihe] *The* apparatus of claim 9 wherein said mounting means for said yarn carrier includes a guide pin formed on said yarn carrier and a slot formed in a guide arm extending across said conveyors.

13. The apparatus of claim 12 wherein said slot is angled downwardly at the extremities, beyond said conveyors, whereby said yarn carriers are depressed below the level of said needles at said extremities.

14. The apparatus of claim 9 wherein said needles are angled in the direction of travel of said conveyors.

15. The apparatus of claim 9 wherein the number of openings per linear dimension in said yarn carrier is greater than the number of needles per linear dimension on each conveyor.

16. The apparatus of claim 9 wherein each yarn carrier is mounted on a guide means, and is adapted for movement between two positions, one adjacent said guide means, and one spaced from said guide means, and said movement being in a direction opposite the direction of travel of said conveyors.

17. The apparatus of claim 16 wherein means are provided to move said yarn carrier from said first position to said second position.

18. The apparatus of claim 17 wherein said means is a pneumatic cylinder.

* * * * *